US011931700B2

(12) United States Patent
Iwai et al.

(10) Patent No.: US 11,931,700 B2
(45) Date of Patent: Mar. 19, 2024

(54) SUBSTRATE FOR LIQUID FILTER

(71) Applicant: TEIJIN LIMITED, Osaka (JP)

(72) Inventors: Ayumi Iwai, Osaka (JP); Koji Furuya, Osaka (JP); Takao Ohno, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 15/933,551

(22) Filed: Mar. 23, 2018

(65) Prior Publication Data

US 2018/0280894 A1 Oct. 4, 2018

(30) Foreign Application Priority Data

Mar. 30, 2017 (JP) .................. 2017-067890

(51) Int. Cl.
*B01D 71/26* (2006.01)
*B01D 69/02* (2006.01)
*B01D 69/10* (2006.01)

(52) U.S. Cl.
CPC ............ *B01D 71/26* (2013.01); *B01D 69/02* (2013.01); *B01D 69/10* (2013.01); *B01D 2201/32* (2013.01); *B01D 2325/02* (2013.01); *B01D 2325/04* (2013.01); *B01D 2325/20* (2013.01); *B01D 2325/34* (2013.01)

(58) Field of Classification Search
None
See application file for complete search history.

(56) References Cited

U.S. PATENT DOCUMENTS

| | | | | |
|---|---|---|---|---|
| 6,666,969 | B1 * | 12/2003 | Funaoka | B29C 48/08 210/500.36 |
| 2007/0080107 | A1 * | 4/2007 | Yang | B01D 67/0034 210/490 |
| 2009/0301307 | A1 * | 12/2009 | Sugiyama | B01D 71/32 96/9 |
| 2012/0137885 | A1 * | 6/2012 | Dullaert | B01D 39/1623 96/12 |
| 2014/0217013 | A1 | 8/2014 | Sato et al. | |
| 2015/0005405 | A1 | 1/2015 | Ishihara et al. | |
| 2015/0079392 | A1 * | 3/2015 | Hayashi | B01D 71/32 428/375 |
| 2016/0001235 | A1 * | 1/2016 | Frisk | B01D 67/0013 427/244 |
| 2016/0082397 | A1 | 3/2016 | Ohno et al. | |
| 2016/0096152 | A1 * | 4/2016 | Ohno | B01D 67/0027 210/500.36 |

FOREIGN PATENT DOCUMENTS

| | | | |
|---|---|---|---|
| JP | 02-251545 A | 10/1990 | |
| JP | 5-25305 A | 2/1993 | |
| JP | 07-246322 A | 9/1995 | |
| JP | 10-263374 A | 10/1998 | |
| JP | 2010-053245 A | 3/2010 | |
| JP | 2010-202828 A | 9/2010 | |
| WO | 2014/181760 A1 | 11/2014 | |
| WO | WO-2014181760 A1 * | 11/2014 | ......... B01D 67/0027 |
| WO | 2015/198948 A1 | 12/2015 | |
| WO | 2018/168871 A1 | 9/2018 | |

OTHER PUBLICATIONS

Liquid-Liquid Porometer, ("Accurate measuring of membrane pore size distributions", Filtration+Separation, Nov./Dec. 2015, 4 total pages). (Year: 2015).*
Office Action dated Nov. 4, 2020 in Japanese Application No. 2017-067890.

\* cited by examiner

*Primary Examiner* — Jonathan M Peo
(74) *Attorney, Agent, or Firm* — Sughrue Mion, PLLC

(57) ABSTRACT

A substrate for a liquid filter contains a polyolefin microporous membrane. A mean flow pore size $d_{PP}$ in a pore size distribution of the polyolefin microporous membrane measured by a half dry method according to gas-liquid phase substitution is from 1 nm to 20 nm. A mean flow pore size $d_{LLP}$ in a pore size distribution of the polyolefin microporous membrane measured by a half dry method according to liquid-liquid phase substitution is from 1 nm to 15 nm. A difference ($d_{PP}-d_{LLP}$) between the mean flow pore size $d_{PP}$ and the mean flow pore size $d_{LLP}$ is 12 nm or less, and a thickness of the polyolefin microporous membrane is from 4 to 25 μm.

10 Claims, No Drawings

SUBSTRATE FOR LIQUID FILTER

CROSS-REFERENCE TO RELATED APPLICATIONS

This application claims priority under 35 USC 119 from Japanese Patent Application No. 2017-067890 filed on Mar. 30, 2017, the disclosure of which is incorporated by reference herein.

BACKGROUND

Technical Field

The present invention relates to a substrate for a liquid filter.

Related Art

In recent years, electronic devices are becoming increasingly smaller with higher performance. In particular, digital devices and portable terminals, as typified by personal computers and smartphones, have been dramatically developed. Among various techniques leading and supporting such development, as is well known, technological innovation in the semiconductor industry has played a major role. In the recent semiconductor industry, the development race is going on in the field where the wiring pattern dimension is below 20 nm, and the manufacturers have been accelerating the construction of cutting-edge production lines.

A lithography step is a step of forming a pattern in the production of semiconductor parts. With the recent development of finer patterns, an extremely high level of technology has been required not only in terms of the nature of the liquid chemical used in a lithography step itself but also for the handling of the liquid chemical prior to application onto a wafer.

A liquid chemical prepared at high level is filtered through a dense filter immediately before application onto a water to remove particles that would greatly affect the pattern formation or yield. In the cutting-edge formation of patterns of less than 20 nm, the capability of collecting particles of less than about 10 nm is required, and filter manufacturers are vigorously advancing the development.

Generally, a liquid filter contains, as a substrate, a porous membrane made of a resin such as polyethylene, polytetrafluoroethylene, nylon, or polypropylene, and is processed into the form of a cartridge and used. Substrates are used according to the intended application in terms of compatibility with the liquid chemical, collection efficiency, processing capacity, and the like. Recently, the reduction of dissolved matter derived from the substrate has been particularly emphasized, and polyethylene microporous membranes are commonly used as substrates.

As typical methods for producing a polyethylene microporous membrane, a phase separation method and a drawing method can be mentioned. A phase separation method is a technique that forms pores utilizing the phase separation phenomenon of a polymer solution. Examples thereof include a heat-induced phase separation method in which phase separation is induced by heat as described in Japanese Patent Application Laid-Open (JP-A) No. H2-251545, a non-solvent-induced phase separation method utilizing the solubility characteristics of a polymer to the solvent, etc. In addition, it is also possible to combine the two techniques, heat-induced phase separation and non-solvent-inducted phase separation, or to further adjust the shape or size of the pore structure by drawing to increase the variation. A drawing method is, for example, as described in Japanese Patent Application Laid-Open (JP-A) Nos. 2010-053245, 2010-202828, H7-246322 and H10-263374, a method in which a polyethylene raw sheet formed in a sheet shape is drawn to extend the amorphous part in the crystal structure under adjusted drawing conditions including the speed, ratio, temperature, etc., thereby forming micropores between lamella layers while forming microfibrils.

However, when particles of less than about 10 nm are to be efficiently collected, conversely, the liquid permeability tends to decrease. That is, there is a trade-off relationship between collection efficiency and liquid permeability. The conventional techniques such as disclosed in JP-A Nos. H2-251545, 2010-053245, 2010-202828, 1-H7-246322 and H10-263374 are insufficient for achieving both collection efficiency and liquid permeability for fine particles of less than about 10 nm.

In order to solve such a problem, in International Publication No. 2014/181760 pamphlet, the control of the water permeation efficiency, bubble point, and film thickness of the polyolefin microporous membrane achieves both collection efficiency and liquid permeability for fine particles of less than about 10 nm.

SUMMARY

Technical Problem

Here, in a case in which the liquid filter is used, a high pressure is applied to the polyolefin microporous membrane depending on clogging of fine particles and filtration conditions, whereby a porous structure may change. In such a case, defects such as deterioration in the collection efficiency of particles of a desired size may occur.

In the conventional technique as described in International Publication No. 2014/181760 pamphlet, excellent collection efficiency can be obtained under a low pressure, but a porous structure changes under a high pressure, which may cause deterioration in collection efficiency.

In terms of preventing a change in the porous structure, a thicker microporous membrane is considered to cause the porous structure to be less likely to collapse even under a high pressure. However, the thicker the microporous membrane is, the lower the liquid permeability is and the smaller the area of a microporous membrane that can be put into a filter cartridge of a certain size is, which causes a smaller filtration area and a higher filter pressure loss. In particular, a substrate for a filter tending to have a smaller pore size causes a higher filter pressure loss. As a result, there is a concern that a burden on a filter handling process will increase. Therefore, it is desirable to make the microporous membrane as thin as possible, and to cause the porous structure to be less likely to collapse even under a high pressure.

Thus, in order to solve the problems described above, an object of the invention is to provide a substrate for a liquid filter which is a thin membrane and exhibits both high liquid permeability and high fine particle collecting efficiency under a high pressure.

Solution to Problem

In order to solve the above problems, the invention is configured as follows.

[1] A substrate for a liquid filter containing a polyolefin microporous membrane, wherein a mean flow pore size $d_{PP}$ in a pore size distribution of the polyolefin microporous membrane measured by a half dry method according to gas-liquid phase substitution is from 1 nm to 20 nm, a mean flow pore size $d_{LLP}$ in a pore size distribution of the polyolefin microporous membrane measured by a half dry method according to liquid-liquid phase substitution is from 1 nm to 15 nm, a difference ($d_{PP}$-$d_{LLP}$) between the mean flow pore size $d_{PP}$ and the mean flow pore size $d_{LLP}$ is 12 nm or less, and a thickness of the polyolefin microporous membrane is from 4 to 25 μm.

[2] The substrate for a liquid filter according to [1], wherein a standard deviation of each of the mean flow pore sizes $d_{LLP}$ and $d_{PP}$ in the pore size distribution is from 1 nm to 5 nm.

[3] The substrate for a liquid filter according to [1] or [2], wherein a maximum pore size in the pore size distribution of the polyolefin microporous membrane is from 15 nm to 25 nm.

[4] The substrate for a liquid filter according to any one of [1] to [3], wherein the polyolefin is a polyethylene composition containing a high-molecular-weight polyethylene having a weight average molecular weight of from 4,000,000 to 6,000,000, and a low-molecular-weight polyethylene having a weight average molecular weight of from 200,000 to 800,000, in a mass ratio of from 50:50 to 80:20.

[5] The substrate for a liquid filter according to any one of [1] to [4], wherein the polyolefin microporous membrane has a water permeation efficiency of from 0.10 to 0.40 ml/min/cm² under a reduced pressure of 90 kPa.

[6] The substrate for a liquid filter according to any one of [1] to [5], wherein a porosity of the polyolefin microporous membrane is from 39% to 70%.

Advantageous Effects of Invention

The invention makes it possible to provide a substrate for a liquid filter which is a thin membrane and exhibits both high liquid permeability and high fine particle collecting efficiency under a high pressure.

DESCRIPTION OF EMBODIMENTS

Hereinafter, embodiments of the invention will be sequentially described, but these descriptions and examples are illustrative of the invention, and do not limit the scope of the invention. Incidentally, throughout this specification, a numerical range using "to" includes its upper limit and lower limit. Regarding a polyolefin microporous membrane, the term "longitudinal direction" means the longitudinal direction of the polyolefin microporous membrane produced in an elongated shape, and the term "width direction" means a direction perpendicular to the longitudinal direction of the polyolefin microporous membrane. Hereinafter the "width direction" is also referred to as "TD", and the "longitudinal direction" is also referred to as a "MD direction".

[Substrate for Liquid Filter]

A substrate for a liquid filter of the invention is a substrate for a liquid filter containing a polyolefin microporous membrane, in which a mean flow pore size $d_{PP}$ in a pore size distribution of the polyolefin microporous membrane measured by a half dry method according to gas-liquid phase substitution is from 1 nm to 20 nm, a mean flow pore size $d_{LLP}$ in a pore size distribution of the polyolefin microporous membrane measured by a half dry method according to liquid-liquid phase substitution is from 1 nm to 15 nm, a difference ($d_{PP}$-$d_{LLP}$) between the mean flow pore size $d_{PP}$ and the mean flow pore size $d_{LLP}$ is 12 nm or less, and a thickness of the polyolefin microporous membrane is from 4 to 25 μm.

The invention as described above can provide a substrate for a liquid filter which is a thin membrane and exhibits both high liquid permeability and high fine particle collecting efficiency under a high pressure. Hereinafter, each constitution will be described in detail.

(Polyolefin Microporous Membrane)

The polyolefin microporous membrane, which is the substrate for a liquid filter of the invention, is a microporous membrane that contains a polyolefin. Here, the microporous membrane means a membrane having a large number of micropores inside and having a structure in which the micropores are connected to each other so that a gas or a liquid can pass from one surface to the other surface. It is preferable that the polyolefin microporous membrane has a polyolefin content of 90 parts by weight or more. As the remainder, an additive such as an organic or inorganic filler or a surfactant may also be contained as long as the effects of the invention are not impaired.

(Mean Flow Pore Size $d_{PP}$)

The polyolefin microporous membrane, which is the substrate for a liquid filter of the invention, is characterized in that it is a thin membrane and exhibits high fine particle collecting efficiency due to a stable porous structure under a high pressure conditions. The mean flow pore size $d_{PP}$ of the polyolefin microporous membrane as measured by a half dry method according to the gas-liquid phase substitution of the polyolefin microporous membrane is required to be 1 nm or more, and the upper limit thereof is required to be 20 nm. In the invention, in a case in which the mean flow pore size $d_{PP}$ of the polyolefin microporous membrane is less than 1 nm, it becomes difficult to obtain sufficient liquid permeability. From such a viewpoint, $d_{PP}$ is preferably 5 nm or more, more preferably 8 nm or more, and still more preferably 10 nm or more. Meanwhile, in a case in which the mean flow pore size $d_{PP}$ of the polyolefin microporous membrane exceeds 20 nm, fine particles of, for example, less than 10 nm cannot be very highly collected. From such a viewpoint, $d_{PP}$ is preferably 18 nm or less, and more preferably 16 nm or less.

(Mean Flow Pore Size $d_{LLP}$)

In the invention, the mean flow pore size $d_{LLP}$ measured by a half dry method according to the liquid-liquid phase substitution of the polyolefin microporous membrane is required to be 1 nm or more, and the upper limit thereof is required to be 15 nm or less. In the invention, in a case in which the mean flow pore size $d_{LLP}$ of the polyolefin microporous membrane is less than 1 nm, it becomes difficult to obtain sufficient liquid permeability. From such a viewpoint, $d_{LLP}$ is preferably 3 nm or more, and more preferably 5 nm or more. Meanwhile, in a case in which the mean flow pore size $d_{LLP}$ of the polyolefin microporous membrane exceeds 15 nm, fine particles of, for example, less than 10 nm cannot be very highly collected. From such a viewpoint, $d_{LLP}$ is preferably 12 nm or less, and more preferably 10 nm or less.

(Difference Between Mean Flow Pore Size $d_{LLP}$ and Mean Flow Pore Size $d_{PP}$)

In the invention, the difference ($d_{PP}$-$d_{LLP}$) between the mean flow pore size $d_{PP}$ and the mean flow pore size $d_{LLP}$ of the polyolefin microporous membrane is required to be 12 nm or less. In the invention, in a case in which the difference ($d_{PP}$-$d_{LLP}$) between the mean flow pore size $d_{PP}$ and the mean flow pore size $d_{LLP}$ of the polyolefin microporous membrane is 12 nm or less, the polyolefin microporous membrane can have a stable porous structure under a high pressure, which makes it possible to maintain stable collection efficiency even under a high pressure due to clogging of the fine particles, filtration conditions, or the like. From such a viewpoint, the difference ($d_{PP}$-$d_{LLP}$) between the mean flow pore size $d_{LLP}$ and the mean flow pore size $d_{PP}$ is more preferably 7 nm or less, and particularly preferably 5 nm or less.

In the invention, as described above, it is important that the mean flow pore size $d_{PP}$ of the polyolefin microporous membrane is from 1 to 20 nm; the mean flow pore size $d_{LLP}$ is from 1 to 15 nm; and $d_{PP}$-$d_{LLP}$ is 12 nm or less. The mean flow pore size $d_{PP}$ measured by the half dry method according to the gas-liquid phase substitution reflects the pore size of the microporous membrane in a case in which liquid flows in under a high pressure. The mean flow pore size $d_{LLP}$ measured by the half dry method according to the liquid-liquid phase substitution reflects the pore size of the microporous membrane in a case in which liquid flows in under a low pressure. The difference ($d_{PP}$-$d_{LLP}$) between the mean flow pore size $d_{PP}$ and the mean flow pore size $d_{LLP}$ represents a difference between pore sizes in a high pressure state and a low pressure state, that is, the difficulty of the deformation of the pore with respect to a pressure. That is, the polyolefin microporous membrane in the invention has a porous structure in which a large number of extremely fine pores are uniformly sized, whereby the polyolefin microporous membrane has a porous structure that is less likely to cause the deformation of the pores to occur even under a high pressure as well as under a low pressure in a case in which a liquid filter is used while the polyolefin microporous membrane is a thin membrane.

A method for controlling such a porous structure is not particularly limited. For example, the porous structure can be controlled by the composition of a polyolefin resin, the concentration of the polyolefin resin in a raw material, the mixing ratio of a plurality of solvents used in the raw material, a heating temperature for expressing a solvent from the inside of the extruded sheet, a pressing pressure, a heating time, a draw ratio, a heat treatment (heat setting) temperature after drawing, an immersion time in an extraction solvent, and an annealing temperature and a annealing treatment time, and the like.

(Thickness)

It is important that the polyolefin microporous membrane, which is the substrate for a liquid filter of the invention, has a thickness of from 4 to 25 µm. In a case in which the polyolefin microporous membrane has a thickness of 4 µm or more, sufficient dynamic strength is likely to be obtained, and handleability during the processing of the polyolefin microporous membrane and the like or durability in the long-term use of a filter cartridge is likely to be obtained, which is preferable. From such a viewpoint, the film thickness of the polyolefin microporous membrane is more preferably 5 µm or more, and still more preferably 6 µm or more. Meanwhile, in a case in which the thickness is 25 µm or less, sufficient water permeation efficiency is likely to be obtained with the microporous membrane singly. In addition, in a filter cartridge of a predetermined size, a larger filtration area is likely to be obtained. This facilitates the flow rate design and structural design of the filter during the processing of the polyolefin microporous membrane, which is preferable. From such a viewpoint, the film thickness of the polyolefin microporous membrane is more preferably 20 µm or less, still more preferably 16 µm or less, and particularly preferably 13 µm or less.

For example, assuming the placement of a filter cartridge in a housing of the same size, the thinner a filter medium (the whole constituent material including the substrate for a filter) is, the larger a filter medium area can be, so that a high-flow-rate/low-filtration-pressure design which is preferable as a liquid filter can be achieved. That is, it becomes possible to design a liquid filter such that the filtration pressure decreases in a case in which the same flow rate is to be maintained while the flow rate increases in a case in which the same filtration pressure is to be maintained. In particular, when the filtration pressure decreases, it becomes much less likely that foreign matters once collected are continuously exposed to the filtration pressure in the filter medium, thus are pushed out from the inside of the filter medium with the lapse of time together with the filtrate, and leak out. It also becomes much less likely that a gas dissolved and present in the liquid to be filtered appears in the form of fine bubbles due to the pressure difference before and after filtration (pressure decrease after filtration). This can also be expected to be effective in improving the filtration yield of the filtration object, such as a chemical solution, and also maintaining its quality at high level over a long period of time.

Meanwhile, the thinner the filter medium is, the lower the strength and durability performance of the filter medium is. However, for example, in designing a filter, it is also possible to combine the filter with a coarse high-strength support for reinforcement (e.g., processing to stack them and fold the stack) to adjust the designing of durability and flow rate.

(Standard Deviations of Mean Flow Pore Sizes $d_{LLP}$ and $d_{PP}$)

In the polyolefin microporous membrane, which is the substrate for a liquid filter of the invention, the standard deviation of each of the mean flow pore sizes $d_{LLP}$ and $d_{PP}$ is preferably from 1 nm to 5 nm. In a case in which the standard deviation of each of the mean flow pore sizes $d_{LLP}$ and $d_{PP}$ is 5 nm or less, fine particles having a particle size of several nanometers are likely to be collected. Even in a case in which a porous structure is exposed to a high pressure during use of a liquid filter, the porous structure is less likely to collapse, which is preferable. From such a viewpoint, it is particularly preferable that the standard deviation of each of the mean flow pore sizes $d_{LLP}$ and $d_{PP}$ is 3 nm or less. Meanwhile, in a case in which the standard deviation of each of the mean flow pore sizes $d_{LLP}$ and $d_{PP}$ of the polyolefin microporous membrane is 1 nm or more, fine particles having a particle size of from several nanometers to several tens of nanometers are likely to be highly collected, which is preferable.

(Maximum Pore Size)

The polyolefin microporous membrane, which is the substrate for a liquid filter of the invention, preferably has a maximum pore size of from 15 nm to 25 nm, and particularly preferably from 17 nm to 20 nm, as measured by the bubble point method. In a case in which the maximum pore size of the polyolefin microporous membrane is 25 nm or less, fine particles having a particle size of several nanometers are likely to be highly collected, which is preferable. Meanwhile, in a case in which the maximum pore size of the polyolefin microporous membrane is 15 nm or more, not only fine particles are likely to be very highly collected, but also sufficient liquid permeation performance is likely to be obtained, which is preferable.

(Porosity)

It is preferable that the polyolefin microporous membrane, which is the substrate for a liquid filter of the invention, has a porosity of from 39% to 70%, and more preferably from 45% to 65%. The porosity of the polyolefin microporous membrane is preferably 39% or more from the viewpoint of good liquid permeation performance. Meanwhile, in a case in which the porosity is 70% or less, the dynamic strength of the polyolefin microporous membrane becomes favorable, and handleability is also improved, which is preferable. Here, the porosity ($\varepsilon$) of the polyolefin microporous membrane is calculated by the following formula.

$$\varepsilon(\%)=\{1-Ws/(ds \cdot t)\} \times 100$$

Ws: Weight per unit of polyolefin microporous membrane (g/m$^2$)
ds: True density of polyolefin (g/cm$^3$)
t: Thickness of polyolefin microporous membrane (μm)

(Water Permeation Efficiency (Water Flow Rate))

In the invention, the water permeation efficiency of the polyolefin microporous membrane is preferably from 0.10 to 0.40 ml/min/cm$^2$ under a reduced pressure of 90 kPa. In a case in which the water permeation efficiency of the polyolefin microporous membrane is 0.10 ml/min/cm$^2$ or more, not only water permeation efficiency as a liquid filter is likely to be sufficiently obtained but also the stability of solution feeding through the filter (for example, the stability of a power load for maintaining a constant solution feeding amount and the stability of a solution feeding amount under a constant solution feeding pressure (constant power load)) are likely to be obtained over a long period of time, which is preferable. From such a viewpoint, the water permeation efficiency is more preferably 0.15 ml/min/cm$^2$ or more. Meanwhile, in a case in which the water permeation efficiency of the polyolefin microporous membrane is 0.40 ml/min/cm$^2$ or less, for example, particles of about 10 nm or less are likely to be highly collected, which is preferable.

(Polyolefin)

In the invention, examples of a polyolefin contained in the polyolefin microporous membrane include a homopolymer or copolymer of polyethylene, polypropylene, polybutylene, polymethylpentene, and the like, or a mixture of one or more kinds thereof. Among them, polyethylene is preferable. As polyethylene, it is suitable to use high-density polyethylene, a mixture of high-density polyethylene and ultrahigh-molecular-weight polyethylene, and the like. Polyethylene may be used in combination with other components. Examples of components other than polyethylene include polypropylene, polybutylene, polymethylpentene, and copolymers of polypropylene and polyethylene. Polyolefins having different properties may be used. That is, polyolefins that are poorly compatible with each other, or have different degrees of polymerization and branching, in other words, polyolefins that are different in crystallinity, stretchability or molecular orientation may be used in combination.

In particular, as polyolefin used in the invention, it is preferable to use a polyethylene composition obtained by mixing a high-molecular-weight polyethylene having a weight average molecular weight of from 4,000,000 to 6,000,000 with a low-molecular-weight polyethylene having a weight average molecular weight of from 200,000 to 800,000. When suitable amounts of two or more kinds of polyethylene are blended, upon drawing, this is effective in forming a network web structure associated with fibrillation and increasing the occurrence of pores. In particular, the blending ratio of the high-molecular-weight polyethylene and the low-molecular-weight polyethylene is preferably from 50:50 to 80:20 by mass ratio. As the low-molecular-weight polyethylene, high-density polyethylene having a density of from 0.92 to 0.96 g/cm$^3$ is preferable.

The weight average molecular weight is determined by dissolving a polyolefin microporous membrane sample in o-dichlorobenzene by heating, to obtain a solution, and measuring the solution under conditions of a column temperature of 135° C. and a flow velocity of 1.0 mL/min, using GPC (Alliance GPC 2000 type, column: GMH 6-HT and GMH 6-HTL, manufactured by Waters). Molecular-weight monodisperse polystyrene (manufactured by Tosoh Corporation) can be used for calibrating the molecular weight.

[Liquid Filter]

The substrate for a liquid filter of the invention as described above is, after suitable processing to impart compatibility with a chemical solution, processed into a cartridge form, which can be used as a liquid filter. The liquid filter is an instrument for removing particles made of organic and/or inorganic substances from a liquid to be treated which contains or may contain the particles. In the liquid to be treated, the particles are present in the form of a solid or a gel. The invention is suitable for removing extremely fine particles having a particle size of about several nanometers. The liquid filter may also be used in not only a semiconductor production step but also other production steps such as display production and polishing, for example.

As a substrate for a liquid filter, a porous substrate made of polytetrafluoroethylene and the like is well known, for example. In a case in which the substrate composed of the polyolefin microporous membrane of the invention described above is used as a substrate for a liquid filter, the substrate has higher compatibility with a chemical solution than that of a polytetrafluoroethylene porous substrate. Accordingly, the processing to impart compatibility with the chemical solution to the filter is facilitated, for example. In a case in which the filter cartridge is placed in a filter housing to start filtration, and the filter is filled with a chemical solution, an air pocket is less likely to be formed in the filter cartridge, resulting in improved yield of chemical solution filtration. Furthermore, since a polyethylene resin itself does not contain a halogen element, the used filter cartridge is easy to handle, which can effectively provide, for example, a reduction in the environmental load.

[Method for Producing Polyolefin Microporous Membrane and Method for Controlling Pore Structure]

The polyolefin microporous membrane, which is the substrate for a liquid filter of the invention, can be preferably produced by the following method. That is, it can be preferably produced by sequentially performing the following steps:

(I) a step of preparing a solution containing a polyethylene composition and a solvent;

(II) a step of melt-kneading the solution, extruding the obtained melt-kneaded article from a die, and cooling and solidifying the same to give a gel-like molded product;

(III) a step of previously expressing a part of the solvent from the gel-like molded product;

(IV) a step of drawing the gel-like molded product in at least one direction; and (V) a step of extracting and cleaning the solvent from the inside of the drawn intermediate molded product.

In the step (I), a solution containing a polyolefin composition and a solvent is prepared, and specifically, a solution containing at least a volatile solvent having a boiling point of less than 210° C. at atmospheric pressure is prepared. Here, it is preferable that the solution is a thermally reversible sol-gel solution. That is, the polyolefin is dissolved by heating in the solvent to form a sol, thereby preparing a thermally reversible sol-gel solution. The volatile solvent having a boiling point of less than 210° C. at atmospheric pressure in the step (I) is not particularly limited as long as it can sufficiently swell or dissolve the polyolefin. Preferred examples thereof include liquid solvents such as tetralin, ethylene glycol, decalin, toluene, xylene, diethyltriamine, ethylenediamine, dimethyl sulfoxide, and hexane. These solvents may be used singly or in combination of two or more. Among them, decalin and xylene are preferable. In the preparation of the solution, in addition to the volatile solvent having a boiling point of less than 210° C. at atmospheric pressure mentioned above, it is also possible to add a non-volatile solvent having a boiling point of 210° C. or more, such as liquid paraffin, paraffin oil, mineral oil, or castor oil.

In the solution in the step (I), in terms of controlling the liquid permeation performance of the polyolefin microporous membrane and the removal performance as a filter medium, the concentration of the polyolefin composition is preferably from 15 to 45% by weight, and more preferably from 20 to 40% by weight. A decrease in the concentration of the polyolefin composition tends to cause a decrease in the dynamic strength, resulting in poor handleability, and further tends to cause breakage to occur more frequently in the formation of a polyolefin microporous membrane. An increase in the concentration of the polyolefin composition tends to make it difficult to form pores.

In the step (II), the solution prepared in the step (I) is melt-kneaded. The obtained melt-kneaded product is extruded from a die and then cooled and solidified to obtain a gel-like molded product. It is preferable that extrusion from a die is performed at a temperature within a range of from the melting point of the polyolefin composition to the melting point+65° C. to obtain an extruded product, and then the extruded product is cooled to obtain a gel-like molded product. It is preferable that the molded product is formed into a sheet shape. Cooling may be quenching with an aqueous solution or an organic solvent, or may also be casting on a cooled metal roll. However, generally, quenching with water or the volatile solvent used for the sol-gel solution is used. It is preferable that the cooling temperature is from 10 to 40° C. It is preferable that a water flow is provided on the surface layer of a water bath, and a gel-like sheet is produced while preventing the mixed solvent released from a gelled sheet in the water bath and floating on the water surface from re-adhering to the sheet.

The step (III) is a step of, prior to drawing the gel-like molded product in at least one direction, preliminarily expressing a part of the solvent from the gel-like molded product. The step (III) can be suitably performed by, for example, applying a pressure to the surface of the gel-like molded product by a method in which the product is passed through the gap between upper and lower two belts or rollers, and the like. The amount of the solvent to be expressed has to be adjusted according to the required liquid permeation performance and filtration object removal performance of the polyolefin microporous membrane. Such adjustment can be made within an appropriate range with the pressing pressure between the upper and lower belts or rollers, the temperature in the expression step, and the number of presses. The pressure that the gel-like molded product receives is preferably adjusted to be from 0.01 to 0.5 MPa using a roller and the like. The pressure is more preferably from 0.05 to 0.2 MPa. The expression temperature is preferably from 40 to 100° C. The number of presses depends on the space allowance in the facility, and thus pressing can be performed without particular limitation. If necessary, single-stage or multistage preheating may be performed before solvent expression to remove a part of the volatile solvent from the inside of the sheet. In this case, it is preferable that the preheating temperature is from 50 to 100° C. The preheating is preferably performed for 5 to 9 minutes per stage. In this case, the preheating is adjusted by a distance to be heated and a conveying speed.

The step (IV) is a step of drawing the gel-like molded product in at least one direction. Here, it is preferable that drawing in the step (IV) is biaxial drawing. Either of sequential biaxial drawing, in which longitudinal drawing and lateral drawing are separately performed, and simultaneous biaxial drawing, in which longitudinal drawing and lateral drawing are simultaneously performed, can be suitably used. A method in which the product is drawn in the longitudinal direction several times and then drawn in the lateral direction, a method in which the product is drawn in the longitudinal direction and drawn in the lateral direction several times, and a method in which the product is sequentially biaxially drawn and then further drawn in the longitudinal direction and/or in the lateral direction once or several times are also preferable.

In terms of controlling the liquid permeation performance and filtration object removal performance of the polyolefin microporous membrane, it is preferable that the draw ratio (the product of the longitudinal draw ratio and the lateral draw ratio) is preferably from 40 to 120 times, and more preferably from 50 to 100 times. An increase in the draw ratio tends to cause breakage to occur more frequently in the formation of a polyolefin microporous membrane. A decrease in the draw ratio tends to cause the thickness to be less uniform. It is preferable that drawing is performed with the solvent remaining in a suitable state. It is preferable that the drawing temperature is from 80 to 125° C. It is particularly preferable that the drawing temperature is from 100 to 110° C.

After drawing in the step (IV), a heat set treatment may be performed. In terms of controlling the liquid permeation performance and filtration object removal performance of the polyolefin microporous membrane, it is preferable that the heat set temperature is from 110 to 143° C. The heat set temperature is more preferably from 125 to 138° C. An increase in the heat set temperature tends to significantly decrease the filtration object removal performance of the polyolefin microporous membrane, while a decrease in the heat set temperature tends to significantly decrease the liquid permeation performance.

The step (V) is a step of extracting and cleaning the solvent from the inside of the drawn intermediate molded product. Here, in the step (V), in order to extract the solvent from the inside of the drawn intermediate molded product (drawn film), it is preferable that cleaning is performed with a halogenated hydrocarbon solvent such as methylene chloride or a hydrocarbon solvent such as hexane. In a case in which cleaning is performed by immersion in a tank filled with a solvent, in order to obtain a polyolefin microporous membrane with low dissolution, cleaning is preferably performed for 20 to 150 seconds, more preferably 30 to 150 seconds, and particularly preferably 30 to 120 seconds. Furthermore, in order to further improve the effect of cleaning, it is preferable that the tank is divided into several stages, and the cleaning solvent is poured from the downstream side of the step of conveying the polyolefin microporous membrane for the cleaning solvent to flow towards the upstream side of the conveying step so that the purity of the cleaning solvent in a downstream tank is higher than in an upstream tank. Depending on the performance requirements for the polyolefin microporous membrane, heat setting may be performed by an annealing treatment. In terms of conveying properties in the step and the like, the annealing treatment is preferably performed at 50 to 150° C., and more preferably 50 to 140° C.

This production method makes it possible to provide a substrate for a liquid filter containing a polyolefin microporous membrane which is a thin membrane and exhibits both excellent liquid permeation performance and excellent filtration object removal performance under a high pressure.

EXAMPLES

Hereinafter, Examples of the invention, Comparative Examples, and various measurement methods will be described. However, the invention is not limited to these Examples.

[Measuring Method]

(Mean Flow Pore Size $d_{PP}$)

The mean flow pore size $d_{PP}$ and the pore size distribution $\sigma\, d_{PP}$ according to gas-liquid phase substitution were measured by a pore size distribution measurement test method [half dry method (ASTM E 1294-89)] using a Perm Porometer porous material automatic micropore size distribution measurement system [Capillary Flow Porometer] manufactured by PMI Co., Ltd. Perfluoropolyester (trade name: Galwick) was used as a test solution (interfacial tension value: 15.9 dyne/cm). The measurement temperature was 25° C., and the measurement pressure was varied within a range of from 50 to 500 psi.

(Mean Flow Pore Size $d_{LLP}$)

The mean flow pore size $d_{LLP}$ and the pore size distribution $\sigma\, d_{LLP}$ according to liquid-liquid phase substitution were measured by a pore size distribution measurement test method [half dry method (ASTM E 1294-89)] using a liquid-liquid porometer LLP-1500A (ultra-low pressure-pore size distribution-permeation performance measuring apparatus) manufactured by PMI Co., Ltd. The sample solutions used were perfluoropolyester (trade name Galwick) and isopropyl alcohol (interfacial tension value: 4.6 dyne/cm). The pores of the membrane were filled with isopropyl alcohol, and the upper portion of the membrane was filled with Galwick. Compressed air was extruded from the above, to gradually increase the pressure. The measurement temperature was 25° C., and the measurement pressure was varied in a range of from 50 to 500 psi.

(Maximum Pore Size)

A maximum pore size according to a bubble point method was measured by a pore size distribution measurement test method [half dry method (ASTM E 1294-89)] using a Perm Porometer porous material automatic micropore size distribution measurement system [Capillary Flow Porometer] manufactured by PMI Co., Ltd. according to gas-liquid phase substitution. The pore size obtained from the minimum pressure at which the flow rate during measurement was generated was taken as the maximum pore size. Perfluoropolyester (trade name: Galwick) was used as a test solution (interfacial tension value: 15.9 dyne/cm). The measurement temperature was 25° C., and the measurement pressure was varied within a range of from 50 to 500 psi.

(Thickness)

A polyolefin microporous membrane was measured for thickness at 20 points using a contact thickness gauge (manufactured by Mitutoyo Corporation), and the results were averaged to determine the thickness. Here, as a contact terminal, a terminal having a cylindrical shape with a bottom face having a diameter of 0.5 cm was used. The measurement pressure was 0.1 N.

(Porosity)

The porosity ($\epsilon$) of a polyolefin microporous membrane was calculated by the following formula.

$$\epsilon(\%) = \{1 - Ws/(ds \cdot t)\} \times 100$$

Ws: Weight per unit of polyolefin microporous membrane (g/m$^2$)

ds: True density of polyolefin (g/cm$^3$)

t: Thickness of polyolefin microporous membrane (μm)

The weight per unit of a polyolefin microporous membrane was determined as follows. A sample of 10 cm×10 cm was cut out; the mass thereof was measured; and the mass was divided by the area to determine the weight per unit.

(Weight Average Molecular Weight of Polyolefin)

The weight average molecular weight was determined as follows. A polyolefin microporous membrane sample was dissolved by heating in o-dichlorobenzene, and subjected to measurement by GPC (Alliance GPC 2000 manufactured by Waters Corporation, columns; GMH6-HT and GMH6-HTL) under the conditions of a column temperature of 135° C. and a flow velocity of 1.0 mL/min. Molecular weight monodisperse polystyrene (manufactured by Tosoh Corporation) was used for calibrating the molecular weight.

(Water Permeation Efficiency (Water Flow Rate))

A polyolefin microporous membrane was pre-immersed in ethanol and dried at room temperature. This polyolefin microporous membrane was set on a liquid permeation cell having a diameter of 47 mm and made of stainless steel (liquid permeation area: S cm$^2$). The polyolefin microporous membrane on the liquid permeation cell was wetted with a small amount (0.5 ml) of ethanol. Then, pre-weighed pure water V (100 ml) was passed therethrough at a pressure differential of 90 kPa, and the time T1 (min) taken for the entire amount of pure water to pass was measured. From the amount of pure water and the time taken for the passing of pure water, the water penetration volume Vs per unit time (min) and unit area (cm$^2$) at a pressure differential of 90 kPa was calculated from the following formula and defined as water permeation efficiency (ml/min·cm$^2$). The measurement was performed in a temperature atmosphere at room temperature of 24° C.

$$Vs = V/(T1 \times S)$$

(Collection Rates Under Low Pressure Condition and High Pressure Condition)

30 ml of an aqueous solution containing the following particles (1) was filtered through a polyolefin microporous membrane at a pressure differential of 1.0 MPa under a high pressure condition, and at a pressure differential of 0.1 MPa under a low pressure condition. From the platinum concentration of the mixed solution before filtration (M1) and the platinum concentration of the filtrate that had passed through the polyolefin microporous membrane (M2), the collection rate of the particles was obtained by the following (Formula 1). A case in which the collection rate was 70% or more was determined as very good (A); a case in which the collection rate was 50% or more and less than 70% was determined as good (B); a case in which the collection rate was 20% or more and less than 50% was determined as slightly poor (C); and a case in which the collection rate was less than 20% was determined as poor (D). The platinum concentration of the solution was determined with a calibration curve obtained by diluting a platinum standard reagent for ICP-AES using ICP-AES, and taking 5 points or more in a concentration range of from 0 to 100 ppb.

Particles (1): platinum colloid (manufactured by Tanaka Kikinzoku), average particle size: 2 nm, particle concentration: 40 ppb $$\text{Collection Rate (\%)}=((M1-M2)/M1))\times 100 \quad \text{(Formula 1)}$$

Example 1

A polyethylene composition obtained by mixing 15 parts by mass of a high-molecular-weight polyethylene having a weight average molecular weight of 4,600,000 (PE1) with 15 parts by mass of a low-molecular-weight polyethylene having a weight average molecular weight of 560,000 (PE2) was used. A pre-prepared mixed solvent of 67.5 parts by mass of liquid paraffin and 2.5 parts by mass of decalin (decahydronaphthalene) was mixed with the polyethylene composition to a total polyethylene resin concentration of 30% by mass, thereby preparing a polyethylene solution.

The polyethylene solution was extruded from a die into a sheet shape at a temperature of 155° C. The extruded product was then cooled in a water bath at 20° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 90° C. while a pressure of 0.05 MPa was applied to the base tape, to partially remove liquid paraffin from the inside of the base tape. Thereafter, the base tape was drawn in the longitudinal direction at a temperature of 90° C. to 5.9 times the original length (longitudinally drawn) and successively drawn in the width direction at a temperature of 105° C. to 13 times the original length (laterally drawn), immediately followed by a heat treatment (heat setting) at 130° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 40° C. and the base tape was annealed while being conveyed on a roller heated to 120° C. to obtain a substrate for a liquid filter containing a polyolefin microporous membrane of the invention.

The above production conditions are shown in Table 1, and the physical properties of the obtained substrate for a liquid filter are shown in Table 2. The following Examples and Comparative Examples are also similarly summarized in Tables 1 and 2.

Example 2

A polyethylene composition obtained by mixing 18 parts by mass of a high-molecular-weight polyethylene having a weight average molecular weight of 4,600,000 (PE1) with 5 parts by mass of a low-molecular-weight polyethylene having a weight average molecular weight of 560,000 (PE2) was used. A pre-prepared mixed solvent of 75.9 parts by mass of liquid paraffin and 1.1 parts by mass of decalin (decahydronaphthalene) was mixed with the polyethylene composition to a total polyethylene resin concentration of 23% by mass, thereby preparing a polyethylene solution.

The polyethylene solution was extruded from a die into a sheet shape at a temperature of 158° C. The extruded product was then cooled in a water bath at 18° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 90° C. while a pressure of 0.05 MPa was applied to the base tape, to partially remove liquid paraffin from the inside of the base tape. Thereafter, the base tape was drawn in the longitudinal direction at a temperature of 90° C. to 7.0 times the original length (longitudinally drawn and successively drawn in the width direction at a temperature of 105° C. to 13 times the original length (laterally drawn), immediately followed by a heat treatment (heat setting) at 130° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 40° C., and the base tape was annealed while being conveyed on a roller heated to 100° C. to obtain a substrate for a liquid filter containing a polyolefin microporous membrane of the invention.

Example 3

A polyethylene composition obtained by mixing 18 parts by mass of a high-molecular-weight polyethylene having a weight average molecular weight of 4,600,000 (PE1) with 5 parts by mass of a low-molecular-weight polyethylene having a weight average molecular weight of 560,000 (PE2) was used. A pre-prepared mixed solvent of 75.9 parts by mass of liquid paraffin and 1.1 parts by mass of decalin (decahydronaphthalene) was mixed with the polyethylene composition to a total polyethylene resin concentration of 23% by mass, thereby preparing a polyethylene solution.

The polyethylene solution was extruded from a die into a sheet shape at a temperature of 156° C. The extruded product was then cooled in a water bath at 18° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 110° C. while a pressure of 0.05 MPa was applied to the base tape, to partially remove liquid paraffin from the inside of the base tape. Thereafter, the base tape was drawn in the longitudinal direction at a temperature of 105° C. to 6.5 times the original length (longitudinally drawn) and successively drawn in the width direction at a temperature of 115° C. to 13 times the original length (laterally drawn), immediately followed by a heat treatment (heat setting) at 130° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 40° C., and the base tape was annealed while being conveyed on a roller heated to 100° C. to obtain a substrate for a liquid filter containing a polyolefin microporous membrane of the invention.

Example 4

A polyethylene composition obtained by mixing 15 parts by mass of a high-molecular-weight polyethylene having a weight average molecular weight of 4,600,000 (PE1) with 15 parts by mass of a low-molecular-weight polyethylene having a weight average molecular weight of 560,000 (PE2) was used. A pre-prepared mixed solvent of 67.5 parts by mass of liquid paraffin and 2.5 parts by mass of decalin (decahydronaphthalene) was mixed with the polyethylene composition to a total polyethylene resin concentration of 30% by mass, thereby preparing a polyethylene solution.

The polyethylene solution was extruded from a die into a sheet shape at a temperature of 164° C. The extruded product was then cooled in a water bath at 16° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 60° C. for 7 minutes, and then at 95° C. for 7 minutes to remove decalin from the inside of the base tape. Subsequently, the base tape was conveyed on a roller heated to 30° C. while a pressure of 0.05 MPa was applied to the base tape, to partially remove liquid paraffin from the inside of the base tape. Thereafter, the base tape was drawn in the longitudinal direction at a temperature of 90° C. to 5.9 times the original length (longitudinally drawn) and successively drawn in the width direction at a temperature of 10.5° C. to 13 times the original length (laterally drawn), immediately followed by a heat treatment (heat setting) at 120° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 40° C., and the base tape was annealed while being conveyed on a roller heated to 120° C. to obtain a substrate for a liquid filter containing a polyolefin microporous membrane of the invention.

Comparative Example 1

A polyethylene composition obtained by mixing 6 parts by mass of a high-molecular-weight polyethylene having a weight average molecular weight of 4,600,000 (PE1) with 24 parts by mass of a low-molecular-weight polyethylene having a weight average molecular weight of 560,000 (PE2) was used. A pre-prepared mixed solvent of 67.5 parts by mass of liquid paraffin and 2.5 parts by mass of decalin (decahydronaphthalene) was mixed with the polyethylene composition to a total polyethylene resin concentration of 30% by mass, thereby preparing a polyethylene solution.

The polyethylene solution was extruded from a die into a sheet shape at a temperature of 158° C. The extruded product was then cooled in a water bath at 18° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 60° C. for 10 minutes, and then at 95° C. for 10 minutes to remove decalin from the inside of the base tape. Subsequently, the base tape was conveyed on a roller heated to 90° C. while a pressure of 0.25 MPa was applied to the base tape, to partially remove liquid paraffin from the inside of the base tape. Thereafter, the base tape was drawn in the longitudinal direction at a temperature of 90° C. to 5.9 times the original length (longitudinally drawn) and successively drawn in the width direction at a temperature of 105° C. to 13 times the original length (laterally drawn), immediately followed by a heat treatment (heat setting) at 118° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 40° C., and the base tape was annealed while being conveyed on a roller heated to 120° C. to obtain a substrate for a liquid filter containing a polyolefin microporous membrane.

Comparative Example 2

A polyethylene composition obtained by mixing 5 parts by mass of a high-molecular-weight polyethylene having a weight average molecular weight of 4,600,000 (PE1) with 18 parts by mass of a low-molecular-weight polyethylene having a weight average molecular weight of 560,000 (PE2) was used. A pre-prepared mixed solvent of 75.9 parts by mass of liquid paraffin and 1.1 parts by mass of decalin (decahydronaphthalene) was mixed with the polyethylene composition to a total polyethylene resin concentration of 23% by mass, thereby preparing a polyethylene solution.

The polyethylene solution was extruded from a die into a sheet shape at a temperature of 158° C. The extruded product was then cooled in a water bath at 16° C. and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 60° C. for 10 minutes, and then at 95° C. for 10 minutes to remove decalin from the inside of the base tape. Subsequently, the base tape was conveyed on a roller heated to 80° C. while a pressure of 0.35 MPa was applied to the base tape, to partially remove liquid paraffin from the inside of the base tape. Thereafter, the base tape was drawn in the longitudinal direction at a temperature of 90° C. to 6.5 times the original length (longitudinally drawn) and successively drawn in the width direction at a temperature of 125° C. to 13 times the original length (laterally drawn), immediately followed by a heat treatment (heat setting) at 130° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher) Thereafter, methylene chloride was removed by drying at 40° C., and the base tape was annealed while being conveyed on a roller heated to 100° C. to obtain a substrate for a liquid filter containing a polyolefin microporous membrane.

Comparative Example 3

A polyethylene composition obtained by mixing 6 parts by mass of a high-molecular-weight polyethylene having a weight average molecular weight of 4,600,000 (PE1) with 24 parts by mass of a low-molecular-weight polyethylene having a weight average molecular weight of 560,000 (PE2) was used. A pre-prepared mixed solvent of 67.5 parts by mass of liquid paraffin and 2.5 parts by mass of decalin (decahydronaphthalene) was mixed with the polyethylene composition to a total polyethylene resin concentration of 30% by mass, thereby preparing a polyethylene solution.

The polyethylene solution was extruded from a die into a sheet shape at a temperature of 156° C. The extruded product was then cooled in a water bath at 20° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 60° C. for 10 minutes, and then at 95° C. for 10 minutes to remove decalin from the inside of the base tape. Subsequently, the base tape was conveyed on a roller heated to 90° C. while a pressure of 0.40 MPa was applied to the base tape, to partially remove liquid paraffin from the inside of the base tape. Thereafter, the base tape was drawn in the longitudinal direction at a temperature of 90° C. to 4.8 times the original length (longitudinally drawn) and successively drawn in the width direction at a temperature of 106° C. to 10 times the original length (laterally drawn), immediately followed by a heat treatment (heat setting) at 140° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 40° C., and the base tape was annealed while being conveyed on a roller heated to 120° C. to obtain a substrate for a liquid filter containing a polyolefin microporous membrane.

Comparative Example 4

A polyethylene composition obtained by mixing 15 parts by mass of a high-molecular-weight polyethylene having a weight average molecular weight of 4,600,000 (PE1) with 15 parts by mass of a low-molecular-weight polyethylene having a weight average molecular weight of 560,000 (PE2) was used. A pre-prepared mixed solvent of 75.9 parts by mass of liquid paraffin and 1.1 parts by mass of decalin (decahydronaphthalene) was mixed with the polyethylene composition to a total polyethylene resin concentration of 30% by mass, thereby preparing a polyethylene solution.

The polyethylene solution was extruded from a die into a sheet shape at a temperature of 153° C. The extruded product was then cooled in a water bath at 14° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 60° C. for 10 minutes, and then at 95° C. for 10 minutes to remove decalin from the inside of the base tape. Subsequently, the base tape was conveyed on a roller heated to 90° C. while a pressure of 0.20 MPa was applied to the base tape, to partially remove liquid paraffin from the inside of the base tape. Thereafter, the base tape was drawn in the longitudinal direction at a temperature of 90° C. to 5.9 times the original length (longitudinally drawn) and successively drawn in the width direction at a temperature of 105° C. to 13 times the original length (laterally drawn), immediately followed by a heat treatment (heat setting) at 116° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 40° C., and the base tape was annealed while being conveyed on a roller heated to 120° C. to obtain a substrate for a liquid filter containing a polyolefin microporous membrane.

Comparative Example 5

A polyethylene composition obtained by mixing 5 parts by mass of a high-molecular-weight polyethylene having a weight average molecular weight of 4,600,000 (PE1) with 23 parts by mass of a low-molecular-weight polyethylene having a weight average molecular weight of 560,000 (PE2) was used. A pre-prepared mixed solvent of 69 parts by mass of liquid paraffin and 3 parts by mass of decalin (decahydronaphthalene) was mixed with the polyethylene composition to a total polyethylene resin concentration of 28% by mass, thereby preparing a polyethylene solution.

The polyethylene solution was extruded from a die into a sheet shape at a temperature of 160° C. The extruded product was then cooled in a water bath at 25° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 55° C. for 10 minutes, and then at 95° C. for 10 minutes to remove decalin from the inside of the base tape. Subsequently, the base tape was conveyed on a roller heated to 40° C. while a pressure of 0.40 MPa was applied to the base tape, to partially remove liquid paraffin from the inside of the base tape. Thereafter, the base tape was drawn in the longitudinal direction at a temperature of 90° C. to 5.8 times the original length (longitudinally drawn) and successively drawn in the width direction at a temperature of 90° C. to 14 times the original length (laterally drawn), immediately followed by a heat treatment (heat setting) at 124° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 45° C., and the base tape was annealed while being conveyed on a roller heated to 110° C. to obtain a substrate for a liquid filter containing a polyolefin microporous membrane.

Comparative Example 6

A polyethylene composition obtained by mixing 8 parts by mass of a high-molecular-weight polyethylene having a weight average molecular weight of 4,600,000 (PE1) with 24 parts by mass of a low-molecular-weight polyethylene having a weight average molecular weight of 560,000 (PE2) was used. A pre-prepared mixed solvent of 53 parts by mass of liquid paraffin and 15 parts by mass of decalin (decahydronaphthalene) was mixed with the polyethylene composition to a total polyethylene resin concentration of 32% by mass, thereby preparing a polyethylene solution.

The polyethylene solution was extruded from a die into a sheet shape at a temperature of 160° C. The extruded product was then cooled in a water bath at 25° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 55° C. for 10 minutes, and then at 95° C. for 10 minutes to remove decalin from the inside of the base tape. Subsequently, the base tape was conveyed on a roller heated to 85° C. while a pressure of 0.20 MPa was applied to the base tape, to partially remove liquid paraffin from the base tape. Thereafter, the base tape was drawn in the longitudinal direction at a temperature of 100° C. to 4.0 times the original length (longitudinally drawn) and successively drawn in the width direction at a temperature of 100° C. to 15 times the original length (laterally drawn), immediately followed by a heat treatment (heat setting) at 118° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 45° C., and the base tape was annealed while being conveyed on a roller heated to 110° C. to obtain a substrate for a liquid filter containing a polyolefin microporous membrane.

Comparative Example 7

A polyethylene composition obtained by mixing 32 parts by mass of a high-molecular-weight polyethylene having a weight average molecular weight of 4,600,000 (PE1) with 8 parts by mass of a low-molecular-weight polyethylene having a weight average molecular weight of 560,000 (PE2) was used. 60 parts by mass of liquid paraffin was mixed with the polyethylene composition to a total polyethylene resin concentration of 40% by mass, thereby preparing a polyethylene solution.

The polyethylene solution was extruded from a die into a sheet shape at a temperature of 160° C. The extruded product was then cooled in a water bath at 25° C., and a water flow was provided on the surface layer of the water bath. A gel-like sheet (base tape) was produced while preventing the mixed solvent released from a gelled sheet in the water bath and floating on the water surface from re-adhering to the sheet. The base tape was dried at 55° C. for 10 minutes, and then at 95° C. for 10 minutes to remove decalin from the inside of the base tape. Subsequently, the base tape was conveyed on a roller heated to 85° C. while a pressure of 0.20 MPa was applied to the base tape, to partially remove liquid paraffin from the base tape. Thereafter, the base tape was drawn in the longitudinal direction at a temperature of 100° C. to 5.8 times the original length (longitudinally drawn) and successively drawn in the width direction at a temperature of 100° C. to 14 times the original length (laterally drawn), immediately followed by a heat treatment (heat setting) at 105° C.

Next, the resulting drawn film was immersed in a two-tank methylene chloride bath successively for 30 seconds per tank, thereby extracting liquid paraffin. Defining the tank where immersion is started as a first tank, and the tank where immersion is finished as a second tank, the purity of the cleaning solvent is (lower) first tank <second tank (higher). Thereafter, methylene chloride was removed by drying at 45° C. and the base tape was annealed while being conveyed on a roller heated to 110° C. to obtain a substrate for a liquid filter containing a polyolefin microporous membrane.

TABLE 1

| | | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Composition of solution | Decalin (parts by mass) | 2.5 | 1.1 | 1.1 | 2.5 | 2.5 | 1.1 | 2.5 | 1.1 | 3 | 15 | — |
| | Paraffine (parts by mass) | 67.5 | 75.9 | 75.9 | 67.5 | 67.5 | 75.9 | 67.5 | 75.9 | 69 | 53 | 60 |
| | PE concentration (% by mass) | 30 | 23 | 23 | 30 | 30 | 23 | 30 | 30 | 28 | 32 | 40 |
| | PE1 (parts by mass) | 15 | 18 | 18 | 15 | 6 | 5 | 6 | 15 | 5 | 8 | 32 |
| | PE1 Mw | 4,600,000 | 4,600,000 | 4,600,000 | 4,600,000 | 4,600,000 | 4,600,000 | 4,600,000 | 4,600,000 | 4,600,000 | 4,600,000 | 4,600,000 |
| | PE2 (parts by mass) | 15 | 5 | 5 | 15 | 24 | 18 | 24 | 15 | 23 | 24 | 8 |
| | PE2 Mw | 560,000 | 560,000 | 560,000 | 560,000 | 560,000 | 560,000 | 560,000 | 560,000 | 560,000 | 560,000 | 560,000 |
| | PE1/(PE1 + PE2) (mass ratio) | 0.50 | 0.78 | 0.78 | 0.50 | 0.20 | 0.22 | 0.20 | 0.50 | 0.18 | 0.25 | 0.80 |
| Extrusion | Die temperature (° C.) | 155 | 158 | 156 | 164 | 158 | 158 | 156 | 153 | 160 | 160 | 160 |
| | Cooling temperature (° C.) | 20 | 18 | 18 | 16 | 18 | 16 | 20 | 14 | 25 | 25 | 25 |
| Expression | First drying temperature (° C.) | 60 | 60 | 60 | 60 | 60 | 60 | 60 | 60 | 55 | 55 | 55 |
| | First drying time (minute) | 7 | 7 | 7 | 7 | 10 | 10 | 10 | 10 | 10 | 10 | 10 |
| | Second drying temperature (° C.) | 95 | 95 | 95 | 95 | 95 | 95 | 95 | 95 | 95 | 95 | 95 |
| | Second drying time (minute) | 7 | 7 | 7 | 7 | 10 | 10 | 10 | 10 | 10 | 10 | 10 |
| | Expression temperature (° C.) | 90 | 90 | 110 | 30 | 90 | 80 | 90 | 90 | 40 | 85 | 85 |
| | Expression pressure (MPa) | 0.05 | 0.05 | 0.05 | 0.05 | 0.25 | 0.35 | 0.4 | 0.2 | 0.4 | 0.2 | 0.2 |
| Drawing | Longitudinal drawing temperature (° C.) | 90 | 90 | 105 | 90 | 90 | 90 | 90 | 90 | 90 | 100 | 100 |
| | Longitudinal drawing ratio (times) | 5.9 | 7.0 | 6.5 | 5.9 | 5.9 | 6.5 | 4.8 | 5.9 | 5.8 | 4.0 | 5.8 |
| | Lateral drawing temperature (° C.) | 105 | 105 | 115 | 105 | 105 | 125 | 106 | 105 | 90 | 100 | 100 |
| | Lateral drawing ratio (times) | 13 | 13 | 13 | 13 | 13 | 13 | 10 | 13 | 14 | 15 | 14 |
| Extraction | Heat set temperature (° C.) | 130 | 130 | 130 | 120 | 118 | 130 | 140 | 116 | 124 | 118 | 105 |
| | Extraction time (second) | 60 | 60 | 60 | 60 | 60 | 60 | 60 | 60 | 60 | 60 | 60 |
| | Drying temperature (° C.) | 40 | 40 | 40 | 40 | 40 | 40 | 40 | 40 | 45 | 45 | 45 |
| | Anneal temperature (° C.) | 120 | 100 | 100 | 120 | 120 | 100 | 120 | 120 | 110 | 110 | 110 |

TABLE 2

|  | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Thickness (μm) | 10 | 12 | 12 | 13 | 11 | 10 | 12 | 41 | 12 | 10 | 13 |
| Porosity (%) | 49 | 59 | 60 | 39 | 50 | 55 | 60 | 63 | 53 | 46 | 34 |
| Mean pore size $d_{PP}$ [nm] | 16 | 16 | 17 | 13 | 21 | 26 | 30 | 13 | 34 | 20 | 13 |
| Mean pore size $d_{LLP}$ [nm] | 8 | 8 | 10 | 7 | 8 | 10 | 16 | 6 | 21 | 7 | 5 |
| dPP - dLLP [nm] | 8 | 8 | 8 | 6 | 13 | 16 | 14 | 7 | 13 | 13 | 8 |
| σdPP [nm] | 1 | 2 | 2 | 5 | 1 | 6 | 10 | 2 | 5 | 3 | 3 |
| σdLLP [nm] | 2 | 2 | 3 | 3 | 4 | 7 | 8 | 2 | 3 | 2 | 2 |
| Bubble point maximum size [nm] | 20 | 22 | 24 | 17 | 28 | 26 | 30 | 18 | 44 | 31 | 16 |
| Water permeation efficiency (ml/min·cm²) | 0.25 | 0.22 | 0.28 | 0.10 | 0.27 | 0.55 | 0.63 | 0.06 | 0.40 | 0.15 | 0.05 |
| Collection rate under low pressure condition | A | A | B | A | B | B | C | A | C | B | A |
| Collection rate under high pressure condition | B | B | B | B | C | C | D | B | D | C | B |

What is claimed is:

1. A liquid filter formed of a polyolefin microporous membrane, wherein:
a mean flow pore size $d_{PP}$ in a first pore size distribution of the polyolefin microporous membrane measured by a half dry method according to gas-liquid phase substitution is from 1 nm to 20 nm,
a mean flow pore size $d_{LLP}$ in a second pore size distribution of the polyolefin microporous membrane measured by a half dry method according to liquid-liquid phase substitution is from 1 nm to 8 nm,
a difference ($d_{PP}$–$d_{LLP}$) between the mean flow pore size $d_{PP}$ and the mean flow pore size $d_{LLP}$ is from 2 nm to 12 nm,
a thickness of the polyolefin microporous membrane is from 4 to 25 μm, a maximum pore size in the first and the second pore size distribution of the polyolefin microporous membrane is from 17 nm to 25 nm, and
the polyolefin microporous membrane is a polyethylene microporous membrane which consists of polyethylene.

2. The liquid filter according to claim 1, wherein a standard deviation of each of the mean flow pore sizes $d_{LLP}$ in the second pore size distribution and $d_{PP}$ in the first pore size distribution is from 1 nm to 5 nm.

3. The liquid filter according to claim 1, wherein the polyolefin microporous membrane contains polyolefin that is a polyethylene composition containing a high-molecular-weight polyethylene having a weight average molecular weight of from 4,000,000 to 6,000,000, and a low-molecular-weight polyethylene having a weight average molecular weight of from 200,000 to 800,000, in a mass ratio of the high-molecular-weight polyethylene:the low-molecular-weight polyethylene of from 50:50 to 80:20.

4. The liquid filter according to claim 1, wherein the polyolefin microporous membrane has a water permeation efficiency of from 0.10 to 0.40 ml/min/cm² under a reduced pressure of 90 kPa.

5. The liquid filter according to claim 1, wherein a porosity of the polyolefin microporous membrane is from 39% to 70%.

6. The liquid filter according to claim 5, wherein the porosity of the polyolefin microporous membrane is from 59% to 70%.

7. The liquid filter according to claim 1, wherein the mean flow pore size $d_{PP}$ is from 5 nm to 20 nm.

8. The liquid filter according to claim 1, wherein the mean flow pore size $d_{LLP}$ is from 3 nm to 8 nm.

9. The liquid filter according to claim 1, wherein the polyethylene contains a high-molecular-weight polyethylene having a weight average molecular weight of from 4,000,000 to 6,000,000, and a low-molecular-weight polyethylene having a weight average molecular weight of from 560,000 to 800,000, in a mass ratio of the high-molecular-weight polyethylene:the low-molecular-weight polyethylene of from 50:50 to 80:20.

10. The liquid filter according to claim 1, wherein the mean flow pore size $d_{PP}$ is from 1 nm to 5 nm.

* * * * *